UNITED STATES PATENT OFFICE 2,684,025

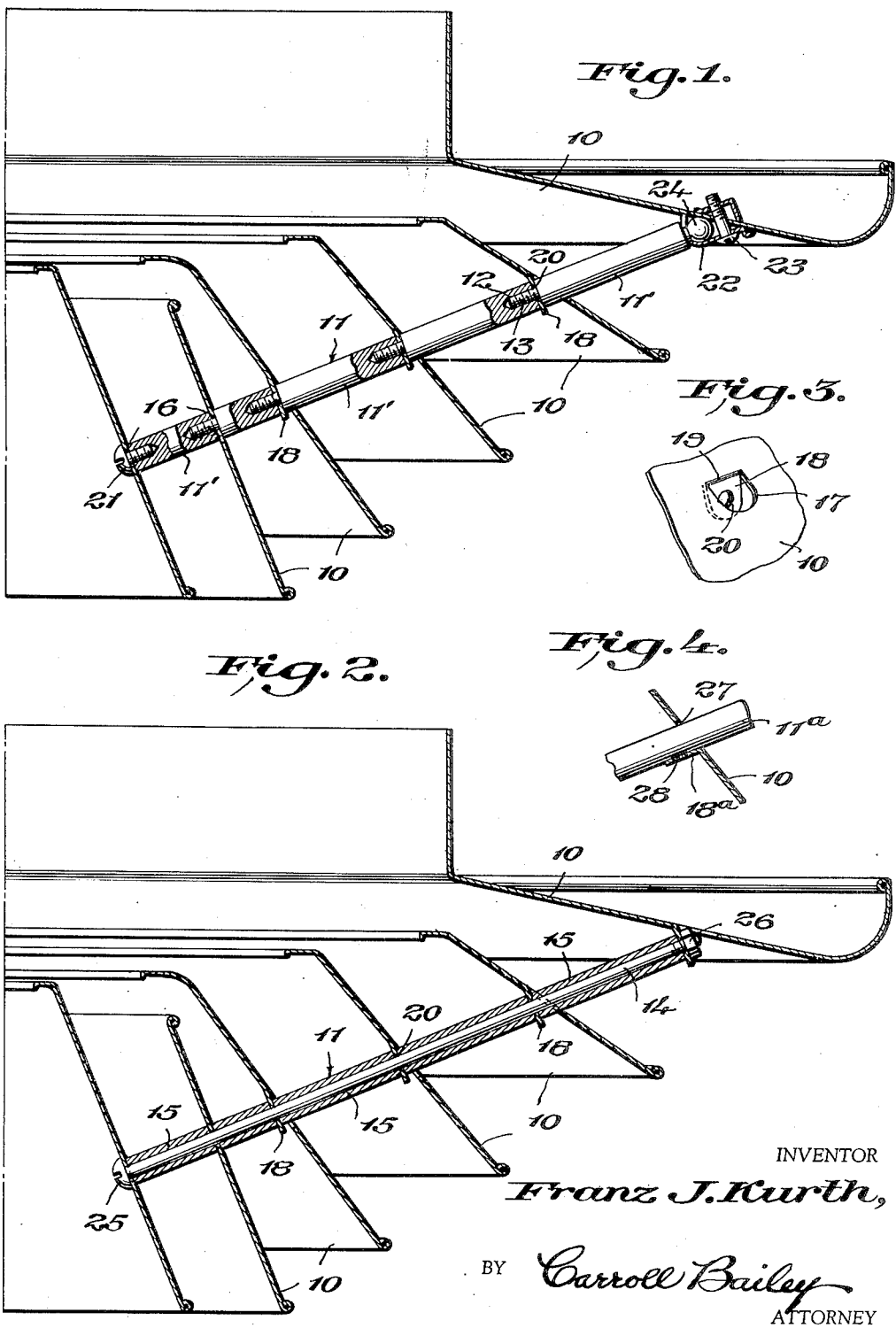

STRUT CONNECTION BETWEEN SPACED APART MEMBERS

Franz J. Kurth, Mamaroneck, N. Y., assignor to Anemostat Corporation of America, New York, N. Y., a corporation of Delaware Application April 7, 1952, Serial No. 280,991

6 Claims. (Cl. 98—40)

This invention relates to strut connections between spaced apart members, and is particularly concerned with strut connections between spaced apart members of sheet material in instances where the struts and the members are inclined relative to each other.

Struts of the type with which the invention is concerned may be composed of separate, member-spacing sections interposed between the members and threadedly connected together at their ends by means of a threaded portion of reduced diameter at one end of any two adjacent sections threaded into an axial bore in the adjacent end of the other section. Alternatively, they may be composed of tie rods extending through the members and having thereon member-spacing sleeves interposed between the members.

It is impractical to form the ends of the strut sections or the ends of the strut sleeves, as the case may be, other than at right angles to the longitudinal axes of the struts. In order, however, to provide firm, rigid connections between the struts and the members, it is necessary that the ends of the strut sections or the ends of the sleeves, as the case may be, abut flatly against the members. Hence, in order to compensate for inclination of the members relative to the struts, it has been the usual practice heretofore to deform the members to bring the portions of the same against which the ends of the strut sections or sleeves abut, into right angular relationship to the struts. However, deforming of the members involves costly operations and in many instances is highly disadvantageous for other reasons.

Accordingly, the object of the invention is to provide simple, practical means to avoid any necessity of deforming the members and, at the same time, to afford firm, flat abutment between the ends of the strut sections or sleeves and the members regardless of the inclination of the members relative to the struts.

With the foregoing and other objects in view, the invention consists in a strut connection between spaced apart members embodying the novel features of construction, combination and arrangement of parts as are illustrated by way of example in the accompanying drawing and as will be hereinafter more fully described and claimed.

In the accompanying drawing, wherein like characters of reference denote corresponding parts:

Fig. 1 is a sectional view illustrating an embodiment of the invention in which the strut is composed of sections threadedly connected together at their ends.

Fig. 2 is a view similar to Fig. 1 illustrating an embodiment of the invention in which the strut is composed of a tie rod having thereon member spacing sleeves.

Fig. 3 is a fragmentary perspective view of one of the strut connected members; and Fig. 4 is a detail sectional view illustrating an alternative embodiment of the invention.

Referring to the drawing in detail, 10 designates in each of Figs. 1 and 2 a plurality of spaced apart members of sheet material and 11 designates, generally, a strut connecting said members together and with respect to which said members are inclined.

As illustrated in Fig. 1 of the drawing, the strut 11 is composed of a plurality of axially alined sections 11', one interposed between each adjacent two of the members 10, and each having at one end a threaded, axial bore 12 into which is threaded an axial extension 13 of reduced diameter at the adjacent end of the next adjacent section. Alternatively and as illustrated in Fig. 2 of the drawing, the strut may be composed of a tie rod 14 having thereon sleeves 15, one interposed between each adjacent two of the members 10.

As aforesaid, it is impractical to form the end faces of the sections 11' or of the sleeves 15 other than at right angles to the axes of said sections or said sleeves. It is, however, important that said end faces abut flatly against the members 10 in order to insure firm, rigid connections between the strut and said members. In this connection and in accordance with the invention, if it should so happen in any particular instance that the strut-intersected portion of any of the members 10 is disposed at substantially right angles to the strut 11, said portion may simply have formed therethrough a hole 16 of a diameter to accommodate either an extension 13 of a strut section 11' or the tie rod 14. On the other hand, such of the members 10 as may have their strut-intersected portions inclined relative to the strut, have substantially U-shaped slits 17 cut therethrough to provide tongues 18 which are integral with said members and which may readily be bent along their lines of junction 19 with said members into substantially right angular relationship to the strut 11.

The tongues 18 preferably are as wide and as long as the diameters of the strut sections 11' or the sleeves 15 and each has formed therethrough, approximately centrally thereof, a hole 20 of substantially the same diameter as the strut section extensions 13 or the tie rod 14, as the case may be. Moreover, said tongues are, of course, alined with each other.

Depending upon the inclination of the strut 11 relative to the members 10, the tongues 18 first are bent so as to extend at substantially right angles to the strut 11 and the strut is installed, in the case of the sectional strut illustrated in Fig. 1, by successively inserting the strut sections 11' between successive adjacent pairs of the members 10, passing the reduced extension 13 of each successive section 11' through the hole 16 or 20, as the case may be, and threading each extension 13 into the hole 12 in the adjacent end of the next adjacent section 11' until the tongue 18 of each intermediate member which has a tongue, and the strut-intersected portion of any intermediate member 10 which may not happen to have a tongue, is firmly clamped between the adjacent ends of a related pair of the strut sections. As to fastening the ends of the strut to the two terminal members 10, one end of the strut may be fastened to one of the terminal members 10 by means of a screw 21 passed through the hole 16 or 20 in said terminal member and threaded into a hole provided in the outer end of the related strut section 11', as illustrated at the left hand side of Fig. 1, while the other end of the strut may be fastened to the other terminal member 10 by means of a clip 22 fastened to said other terminal member by a screw 23 and engaged with a ball head 24 provided on the outer end of the related strut section 11', as illustrated at the right hand side of Fig. 1. Of course, both ends of the strut may be fastened in either of the ways described or, alternatively, connections of any other suitable type may be provided between the respective ends of the strut and the two terminal members 10.

In the case of the tie rod and sleeve strut illustrated in Fig. 2, assembly of the strut with the members 10 is effected by successively inserting the sleeves 15 between adjacent pairs of said members 10 and progressively moving the tie rod longitudinally through said sleeves and the holes 16 in such of said members 10 as may not have tongues and through the holes in said tongues 18. A head 25 and a nut 26 on opposite ends of the tie rod engaged against the outer sides of the strut intersected portions of the two terminal members 10, respectively, may be provided for clamping all of the members 10 and the sleeves 15 tightly together. Alternatively, any other suitable means may be provided to clamp the members 10 and the sleeves 15 firmly together.

From the foregoing it will be apparent that the tongues 18 struck from the members 10 provide simple, readily adjustable means whereby firm, flat abutment of the ends of the strut sections or the strut sleeves with the members 10 may readily be obtained in any instance where a member 10 is inclined relative to the strut, regardless of the inclination of the strut relative to the member.

One art in which the invention is especially useful and desirable is the ventilating art. In this art it is common to employ spaced apart air flow directing members and to connect them together by struts which are inclined relative to the members. For example, in air outlet devices through which fresh or treated air is delivered from air supply ducts into rooms or other enclosures for heating, cooling, ventilating or other purposes, it is common to employ an outermost or air confining member having therein an air deflecting member or members, and to connect such members by struts which are inclined relative to the members. Figs. 1 and 2 of the drawings are illustrative of a portion of such an air outlet device, the larger or outermost member 10 being an air confining member and the other members 10 being air deflecting members. The members 10 are spaced apart and are inclined forwardly and outwardly whereby air delivered forwardly through the device is divided into a plurality of separate streams which are deflected outwardly, the air thereby being delivered from the device in substantially draftless, diffused form. In such devices it has been the usual practice heretofore to press or otherwise deform the members 10 to bring the portions thereof against which the ends of the strut sections 11' or the ends of the strut sleeves 15 abut, into permanent right angular relationship to the struts 11 in order to obtain firm, flat abutment of the ends of the strut sections or sleeves against said portions of said members. Deforming of the members 10 involves, however, costly operations, particularly since said members are differently inclined and each must therefore be differently deformed. Moreover, the deformations interfere with free, even flow of air over said members and produce undesirable turbulence and noise. Furthermore, deforming of the members is practical only if the members are formed from certain more or less soft materials, such as aluminum, and is not practical if the members are formed from other more or less hard materials such as steel. The present invention therefore is of special advantage in air outlet and similar devices because the tongues 18 may be produced simply and economically and because they may readily be bent to enable firm connections to be made between the members 10 and the struts 11 regardless of the inclination of the members 10 relative to the struts and regardless of the material from which said members are formed. Moreover, the tongues 18 may have their lines of junction 19 with the members 10 located relative to said members so that said tongues are bendable inwardly rather than outwardly relative to the air deflecting members 10 to positions at right angles to the struts. Hence, said tongues do not interfere with free, even flow of air over the rear faces of the air deflecting members 10.

As illustrated in Fig. 4 of the drawing, it is within the purview of the invention to provide any of the members 10 with a tongue 18ᵃ in the manner previously described, to pass a strut rod 11ᵃ through the hole 27 in the member 10 formed by bending the tongue 18ᵃ from said member, to bend said tongue against the side of said strut rod, and to weld said tongue to said strut rod as indicated at 28.

From the foregoing description considered in connection with the accompanying drawing it is believed that the features and advantages of the invention will be readily understood and appreciated. It is desired to point out, however, that while only certain specific embodiments of the invention have been illustrated and described, the same is readily capable of other specifically different embodiments within its spirit and scope as defined in the appended claims.

I claim:
1. A structure including at least two spaced apart members and a strut connecting them, said strut including an element interposed between and inclined relative to the members and having end faces disposed at right angles to its longitudinal axis, said members being slit to provide bendably adjustable tongues integral with the same against which the end faces of said strut element abut, said tongues being bent relative to said members to abut flatly against the end faces of said strut element, said strut including means for securing said strut element between said tongues with its end faces clamped securely and flatly against said tongues.

2. A structure including at least two spaced apart members and a strut connecting them, said strut including an element interposed between and inclined relative to the members and having end faces disposed at right angles to its longitudinal axis, said members being slit to provide bendably adjustable tongues integral with the same against which the end faces of said strut element abut, said tongues being bent relative to said members to abut flatly against the end faces of said strut element and each having a hole formed therethrough, said strut including means for securing said strut element between said tongues with its end faces clamped securely and flatly against said tongues, said means in part extending through said holes.

3. A structure including a plurality of spaced apart members and a strut connecting them, said strut being inclined relative to said members and comprising a plurality of sections one interposed between each adjacent two of said members, each section having end faces disposed at right angles to the longitudinal axis of the strut, said members being slit to provide bendably adjustable tongues integral therewith and against which the end faces of the strut sections abut, said tongues being bent relative to said members into positions at right angles to said strut so that the end faces of the strut sections abut flatly against them, said tongues having holes therein, one end of each strut section having an axial hole therein, the adjacent ends of the next adjacent strut sections having threaded axial extensions of reduced diameters extending through the holes in said tongues and threaded into said strut section holes.

4. A structure including a plurality of spaced apart members and a strut connecting them, said strut being inclined relative to said members and including a plurality of sleeves one interposed between each adjacent two of said members, said sleeves having end faces disposed at right angles to the longitudinal axis of the strut, said members being slit to provide bendably adjustable tongues integral therewith and against which the end faces of the sleeves abut, said tongues being bent relative to said members into positions at right angles to said strut so that the end faces of said sleeves abut flatly against them, said tongues having holes therein, a tie rod extending through said sleeves and the holes in said tongues, and means cooperating with said tie rod to clamp said sleeves and said tongues tightly together.

5. A structure including at least two spaced apart members and a strut connecting them, said strut including an element interposed between and inclined relative to the members and having end faces disposed at right angles to its longitudinal axis, said members having holes therein through which said strut extends, bendably adjustable tongues carried by said members and disposed in alinement with said holes and against which the end faces of said strut element abut, said tongues being bent relative to said members to abut flatly against the end faces of said strut element, said strut including means for securing said strut element between said tongues with its end faces clamped securely and flatly against said tongues.

6. A structure including at least two spaced apart members and a strut connecting them, said strut including an element interposed between and inclined relative to the members and having end faces disposed at right angles to its longitudinal axis, said members having holes therein through which said strut extends, bendably adjustable tongues carried by said members and disposed in alinement with said holes and against which the end faces of said strut element abut, said tongues being bent relative to said members to abut flatly against the end faces of said strut element and each having a hole formed therethrough, said strut including means for securing said strut element between said tongues with its end faces clamped securely and flatly against said tongues, said means in part extending through the holes in said tongues.

References Cited in the file of this patent

UNITED STATES PATENTS

| Number | Name | Date |
|---|---|---|
| 2,531,733 | Honerkamp | Nov. 28, 1950 |
| 2,582,532 | Dean | Jan. 15, 1952 |